(12) United States Patent
Johansson et al.

(10) Patent No.: US 7,719,285 B2
(45) Date of Patent: May 18, 2010

(54) GROUND FAULT DETECTION

(75) Inventors: Stefan G. Johansson, Vasteras (SE); Marek Fulczyk, Cracow (PL); Tord Bengtsson, Vasteras (SE); Sture Lindahl, Lund (SE); Gabriel Olguin, Santiago (CL)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 12/388,273

(22) Filed: Feb. 18, 2009

(65) Prior Publication Data

US 2009/0160454 A1    Jun. 25, 2009

Related U.S. Application Data

(63) Continuation of application No. PCT/SE2007/000724, filed on Aug. 15, 2007.

(30) Foreign Application Priority Data

Aug. 18, 2006    (EP) .................................. 06445061

(51) Int. Cl.
*G01R 31/14* (2006.01)
(52) U.S. Cl. ..................... 324/509; 318/434; 361/42; 361/48; 702/58
(58) Field of Classification Search .............. 324/509; 361/31, 42–50
See application file for complete search history.

(56) References Cited

U.S. PATENT DOCUMENTS

| 4,368,498 | A  | * | 1/1983  | Neuhouser ............... 361/48 |
| 5,508,620 | A  | * | 4/1996  | Pfiffner .................. 324/545 |
| 6,320,731 | B1 | * | 11/2001 | Eaves et al. ............. 361/42 |
| 2004/0145842 | A1 | * | 7/2004 | Rice ...................... 361/42 |

FOREIGN PATENT DOCUMENTS

WO    00/77906 A    12/2000

OTHER PUBLICATIONS

International Search Report, Nov. 2007, 2 pages.
International Preliminary Report on Patentaility & Writtten Opinion the International Searching Authority, PCT/SE2007/000724, Feb. 24, 2009, 7 pages.

* cited by examiner

*Primary Examiner*—Timothy J Dole
*Assistant Examiner*—Benjamin M Baldridge
(74) *Attorney, Agent, or Firm*—St. Onge Steward Johnston & Reens LLC

(57) ABSTRACT

The present invention relates to a ground fault detection arrangement for a synchronous three-phase electrical machine, and an electrical system comprising a ground fault detection arrangement and a synchronous three-phase electrical machine. The ground fault detection arrangement injects an off-nominal frequency voltage between a neutral point of the synchronous three-phase electrical machine and ground and measure resultant currents to detect a ground fault.

8 Claims, 5 Drawing Sheets

GROUND FAULT DETECTION

CROSS-REFERENCE TO RELATED APPLICATIONS

The present application is a continuation of pending International patent application PCT/SE2007/000724 filed on Aug. 15, 2007 which designates the United States and claims priority from European patent application 06445061.2 filed on Aug. 18, 2006, the content of which is incorporated herein by reference.

FIELD OF THE INVENTION

The present invention relates generally to ground fault detection and more particularly to a ground fault detection arrangement.

BACKGROUND OF THE INVENTION

Ground faults in a generator stator winding are the most frequent internal generator electrical fault, and the most frequent cause of damage to the generator stator and a direct cause of phase-to-phase fault of the generator stator. All other electrical faults are always preceded by the ground faults. A ground fault is caused by physical damage to the stator winding or aging of the insulation of the stator. Therefore, stator ground-fault protection is the primary element of a protection system for a generator. Improper operation of ground-fault protection of the stator winding increases the possibility that a ground fault will transform into a phase-to-phase fault, which ultimately will damage the generator.

In order to effectively protect unit-connected generators against the effects of ground faults in the stator windings the phenomena that accompany these faults must be understood. The effects of ground faults depend on energy emitted in a ground-fault channel and on ground-fault over-voltages. By proper operation of ground fault protection it is possible to create conditions under which erosion of the magnetic circuit or stator frame caused by a ground-fault arc is insignificant or totally eliminated. Thus, the occurrence of phase-to-phase faults in the generator is practically impossible, if the ground-fault protection operates properly. During these conditions optimum protection of generator-transformer units against the effects of ground faults in the stator windings is ensured. The repair time for a single line to ground fault should be fairly short since only a stator winding have to be exchanged. The repair time for a phase-to-phase fault may take several months implying a (partial) restacking of the stator core.

In order to minimize the possibility of improper operation of a ground-fault protection system for a generator the particular types of protections forming the system should use different excitation parameters. The neutral point of a generator is not usually directly grounded, and the stator ground-fault currents are then relatively low, especially in generators of generator-transformer units. But even such small currents can cause significant damages to the generator stator iron. They can also transform into phase-to-phase faults.

The method used for protection of a generator against ground faults in the stator winding depends on the method of connecting the generator to the power system. There are several possibilities ranging from directly grounded neutral, different levels of resistive and inductive connection of the neutral, to utilizing isolated neutral. Resistively grounded generators are either connected with a resistor directly or transformed via a neutral grounding transformer utilizing a low voltage resistor on the secondary side of the transformer.

A generator directly connected to bus bars and the power system without step-up transformer is usually of low power and the ground-fault protection is then based on supervising the amplitude or direction of the neutral current. A generator connected to the power system via a step-up transformer is theoretically quite simple, because the primary circuit of the step-up transformer is always delta connected and it forms a natural barrier for the ground faults on the higher voltage side. The ground faults on the stator winding can then be detected by monitoring the voltage between the generator neutral point and ground.

There are primarily two methods which in connection with a zero-sequence based protection system may ensure 100% protection for the generator stator winding. One of the methods uses third harmonic in voltages in the generator neutral point and at its terminal. The other method injects a low frequency signal to the generator circuit.

There are three main limitations which influence the length of the stator winding, which is covered by this protection during different operating conditions. They are connected with the following values or parameters of the generator and protection system: Maximum ground-fault current flowing in the generator neutral point; minimum injection voltage which can be measured with good accuracy; and maximum zero-sequence component in the generator neutral point during ground faults in the stator winding. The first and third limitations are independent of the protection system and depends only on parameters of the generator, the grounding system and unit transformer. However, the second limitation can be used to improve ground-fault protection dependent on the protection system.

Further, existing injection methods utilizes an injection frequency below 50 Hz, as higher frequencies increases capacitive current making it difficult to detect changes in the resistance used to detect ground faults.

SUMMARY OF THE INVENTION

An object of the present invention is to provide a ground fault detection arrangement, which can detect less significant ground faults in a synchronous three-phase electrical machine.

The invention is based on the realization that by measuring currents resultant from the injection voltage in more than one position in the synchronous three-phase electrical machine improved detection is achieved, without increasing injection voltage.

According to a first aspect of the present invention there is provided a ground fault detection arrangement.

According to a second aspect of the present invention there is provided an electrical system.

According to a third aspect of the present invention there is provided a method.

Further preferred embodiments are defined by the dependent claims.

The first current is preferably measured between the neutral point and ground of the synchronous three-phase electrical machine, since this position is the least disturbed and still covers all three phases of the electrical machine.

The ground fault detection arrangement preferably comprises a voltage transformer or a grounding transformer, when a grounded neutral point is used in the electrical machine.

The second current is preferably measured at a secondary side of a grounding transformer or voltage transformer, between ground and a primary side of the grounding transformer or voltage transformer, or is mounted on the phase windings of the three-phase electrical machine.

The electrical machine is preferably a generator. The generator can be a high voltage generator usually comprised by a cable wound stator and terminal voltages well above 25 kV. Due to the associated cost of a prior art injection unit, injection of a low frequency signal has mostly been attached to larger type of generators with a terminal voltage range of typically 5-25 kV and ratings above tens of MVA. By use of injection from the low voltage side of a voltage transformer according to e.g. the first embodiment of the present invention, the injection principle can be provided for much lower costs than before and can thus be used for many more applications.

The ground fault detection arrangement preferably comprises a temperature detection means arranged to detect a working temperature of the electrical machine, in particular the neutral resistor and other auxiliary devices, allowing ground fault detection to be temperature compensated.

By measuring a complex value of the resultant current the injection voltage can be used for frequencies well above 50 Hz, since small changes in resistance now can be measured despite a large capacitance reactance, which will be beneficial for e.g. avoiding electrical interference with existing speed gauges.

Further, by measuring a complex value of the resultant current a ground fault detection arrangement according to the present invention will also handle all types of grounding methods on generators in a similar way which provides for production advantages.

BRIEF DESCRIPTION OF THE DRAWINGS

The present invention will become more fully understood from the detailed description of embodiments given below and the accompanying drawings, which are given by way of illustration only, and thus, are not limitative to the present invention, in which.

DETAILED DESCRIPTION OF THE INVENTION

In the following description, for purpose of explanation and not limitation, specific details are set forth, such as particular techniques and applications in order to provide a thorough understanding of the present invention. However, it will be apparent for a person skilled in the art that the present invention may be practiced in other embodiments that depart from these specific details. In other instances, detailed description of well-known methods and apparatuses are omitted so as not to obscure the description of the present invention with unnecessary details.

A first embodiment of the present invention will now be described with reference to FIGS. 1-3.

Figure 1:
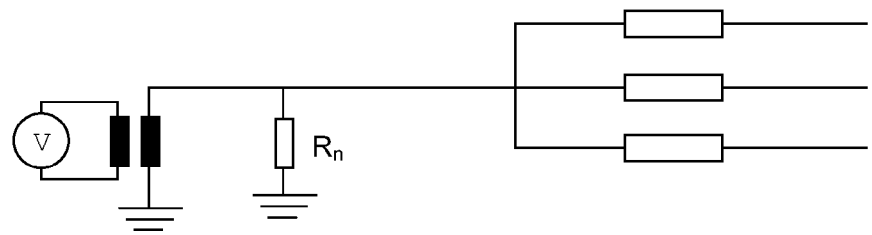
FIG. 1 schematically shows a synchronous three-phase electrical machine with a neutral resistor and a voltage transformer.

A stator part of a synchronous three-phase electrical machine, such as a generator, is schematically shown in FIG. 1. The synchronous three-phase electrical machine is Y-connected and is at its neutral point connected to ground. The synchronous three-phase electrical machine comprises a neutral resistor $R_n$ between the neutral point and ground, to reduce possible ground-fault currents. The neutral resistor $R_n$ is usually adapted to reduce the maximum ground fault currents for faults in the stator to the order of 5-15 ampere. The synchronous three-phase electrical machine further comprises a potential voltage transformer V placed parallel with the ground resistor $R_n$. The potential voltage transformer V is e.g. used for other protection applications such as 95% protection or third harmonic protection of the stator windings of the electrical machine. A potential voltage transformer usually has a ratio of maximum expected voltage in the neutral to 110V and roughly 20-100 VA.

To detect ground faults in the electrical machine, in any of its three phases, a ground-fault detection arrangement is arranged to inject an off-nominal frequency voltage $U_i$ between the neutral point of the electrical machine and ground. The frequency of the injected voltage $U_i$ is usually from tens of Hz to a few hundred Hz and different from, or off-nominal, the nominal frequency of the electrical machine. The injected voltage $U_i$ is injected through the potential voltage transformer V. The voltage $U_i$ is thus injected in parallel with the neutral resistor $R_n$, which is illustrated in FIGS. 2 and 3.

The ground-fault detection arrangement is provided with a first measurement means, such as a current shunt or a current transformer, arranged to measure a first current at a first position of the electrical machine. The first current is resulting from the injected voltage $U_i$. The ground-fault detection arrangement is further provided with a second measurement means, such as a current shunt or a current transformer, arranged to measure a second current at a second position, different from the first position of the electrical machine. The second current is resulting from the same injected voltage $U_i$ as the first current. Alternatively, a Rogowski coil can be used to pick up the current measurements.

Figure 2:
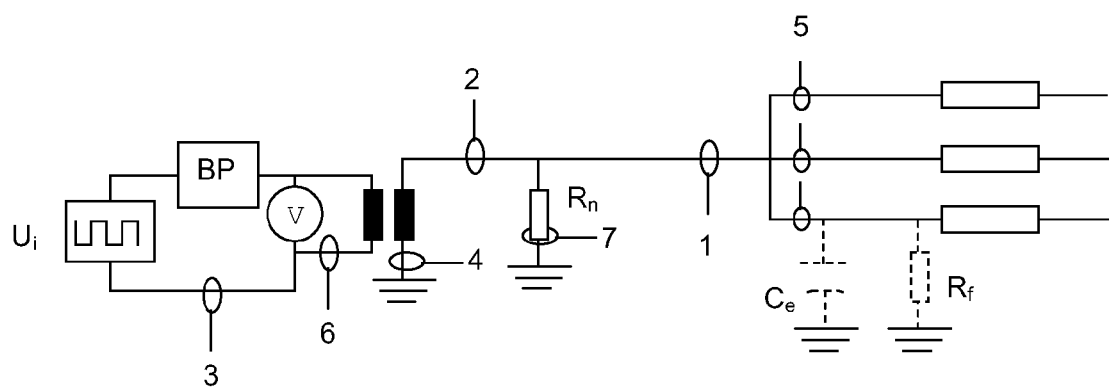
FIG. 2 schematically shows a ground fault detection system according to a first embodiment of the present invention, for a synchronous three-phase electrical machine as shown in FIG. 1.
Figure 3:
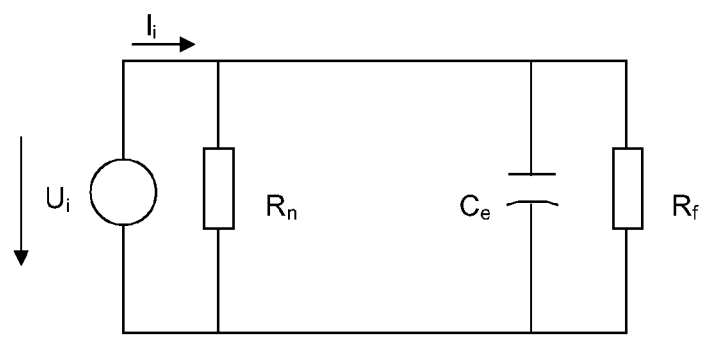
FIG. 3 shows an equivalent diagram, in a ground-fault situation, of the ground fault detection system shown in FIG. 2.

The first position is preferably between the neutral point of the electrical machine and ground, i.e. one of positions 1, 2 or 4 in FIG. 2, or between the injector and the potential voltage generator, i.e. position 3 in FIG. 2. The second position(s) is preferably in the three phases of the electrical machine, i.e. positions 5 in FIG. 2, at a secondary side of the potential voltage transformer, i.e. position 3 in FIG. 2, between ground and a primary side of the potential voltage transformer, i.e. position 4 in FIG. 2, between the neutral point and the primary side of the potential voltage transformer, i.e. position 2 in FIG. 2, between the potential voltage generator and its transformer, i.e. position 6 in FIG. 2, or over the neutral resistor $R_n$, i.e. position 7 in FIG. 2.

By measuring the resultant current at least at two different positions of the electrical machine the accuracy of the ground-fault detection arrangement is improved without substantially increasing costs and without influencing the primary wiring of the machine. It will allow for having a similar design independent of the method of grounding the electrical machine.

In case of the grounding method uses a high resistor neutral the temperature drift of the resistor, and/or the temperature drift of the working temperature of the electrical machine, can be used to adjust the value the resistor, which in turn can be used adjusts the resultant currents. This will allow for an inherent supervision of the neutral resistor indicating small changes of its value. The integrity of the resistor is therefore closely monitored with the present invention.

For the position of the measurement means on the phase windings, the present invention will also discriminate in which phase a ground fault has occurred in. In this situation more than two currents are used to detect the fault since the non-faulty phases of the windings will have different characteristics compared to the faulty phase.

The ground fault detection arrangement further comprises a control means, such as a micro processor or similar, arranged to detect a ground fault by calculations based on the two currents, or based on more than two currents. Usually such calculation are based on a fault resistance $R_f$ apart from the neutral resistor $R_n$, but the accuracy of the calculations can be further improved by basing such calculations on a fault impedance comprising the resistance $R_f$ in parallel to a fault capacitance $C_e$.

The injection means preferably also comprises a band pass filter BP such that the injection circuit will not burden the potential voltage transformer during a 50 Hz single line to ground fault.

To protect the electrical machine from ground faults the ground fault detection arrangement is complemented with protection means known by the person skilled in the art. A thus complemented ground fault detection arrangement and a synchronous three-phase electrical machine together makes up an electrical system, which protects the electrical machine from ground faults.

Although the injected voltage has been described as injected parallel with the neutral resistor, it can alternatively be injected in series with the neutral resistor.

Figure 4:
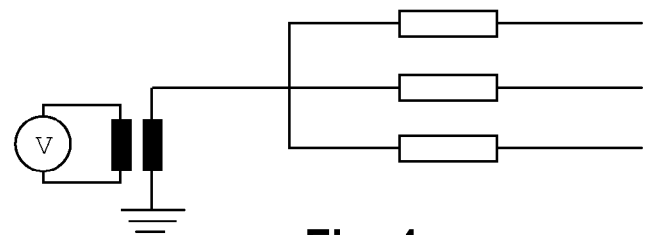
FIG. 4 schematically shows a synchronous three-phase electrical machine without a neutral resistor but with a voltage transformer.
Figure 5:
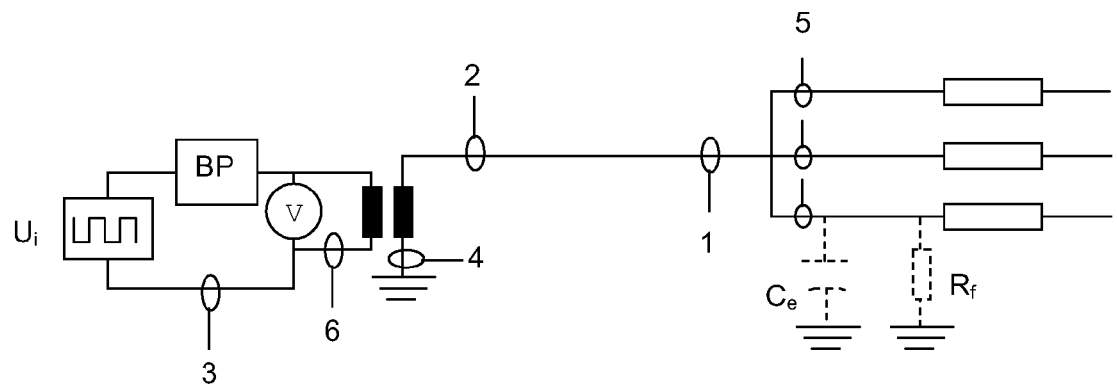
FIG. 5 schematically shows a ground fault detection system according to a second embodiment of the present invention, for a synchronous three-phase electrical machine as shown in FIG. 4.
Figure 6:
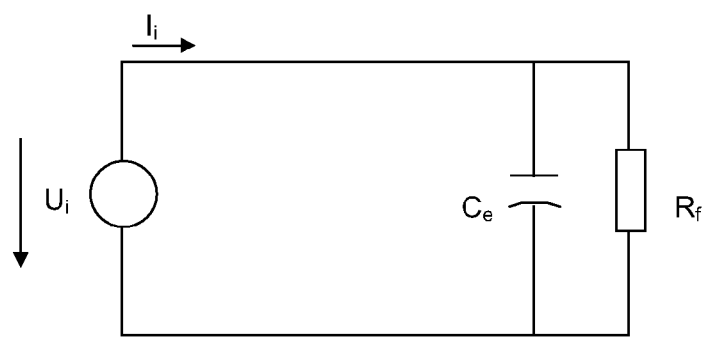
FIG. 6 shows an equivalent diagram, in a ground-fault situation, of the ground fault detection system shown in FIG. 5.

A second embodiment of the present invention is shown in FIGS. 4-6, which is identical with the first embodiment of the present invention described above apart from that no neutral resistor is used in the electrical machine. Further, since no neutral resistor is used measurement positions 1 and 2 will be the same position, and position 7 does not exist.

Figure 7:
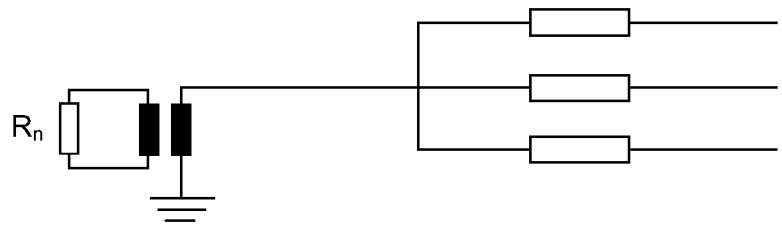
FIG. 7 schematically shows a synchronous three-phase electrical machine with a distribution grounding transformer.
Figure 8:
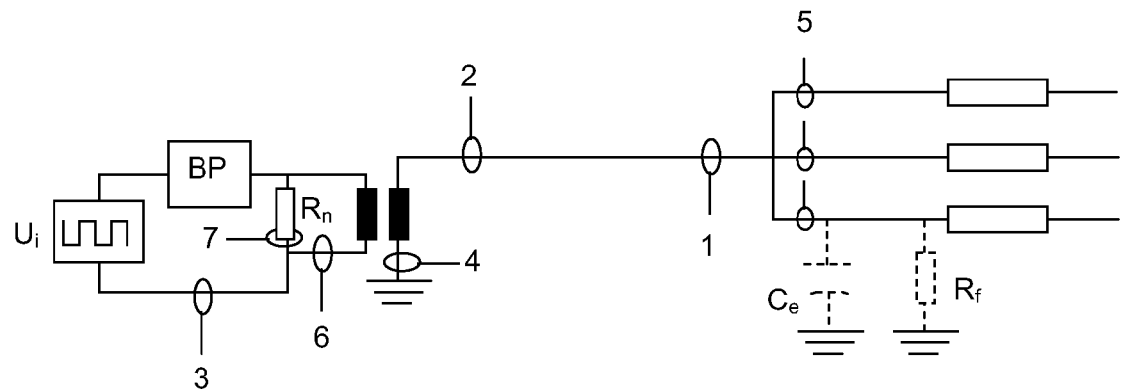
FIG. 8 schematically shows a ground fault detection system according to a third embodiment of the present invention, for a synchronous three-phase electrical machine as shown in FIG. 7.
Figure 9:
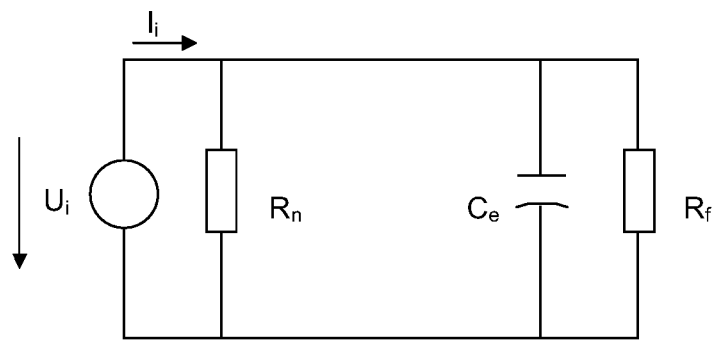
FIG. 9 shows an equivalent diagram, in a ground-fault situation, of the ground fault detection system shown in FIG. 8.

A third embodiment of the present invention is shown in FIGS. 7-9, which is identical with the second embodiment of the present invention described above apart from that a distribution grounding transformer is used in the electrical machine to transform the neutral resistor to a low voltage design. Further, the ground fault detection arrangement according to the present invention is arranged in the secondary side thereof, to inject a signal directly on the low voltage side thereof.

A distribution type grounding transformer usually has a secondary voltage level of 240 V and a rating of 15-300 kVA.

The second and third embodiments of the present invention can be combined with both a potential voltage transformer and a distribution grounding transformer, positioning the ground fault detection arrangement in the secondary side of either of the transformers, or even combining all three functions in one transformer.

Figure 10:
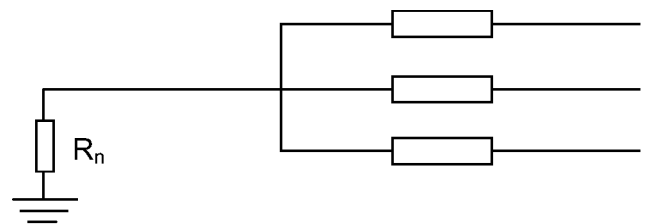
FIG. 10 schematically shows a synchronous three-phase electrical machine with a neutral resistor but without a voltage transformer.
Figure 11:
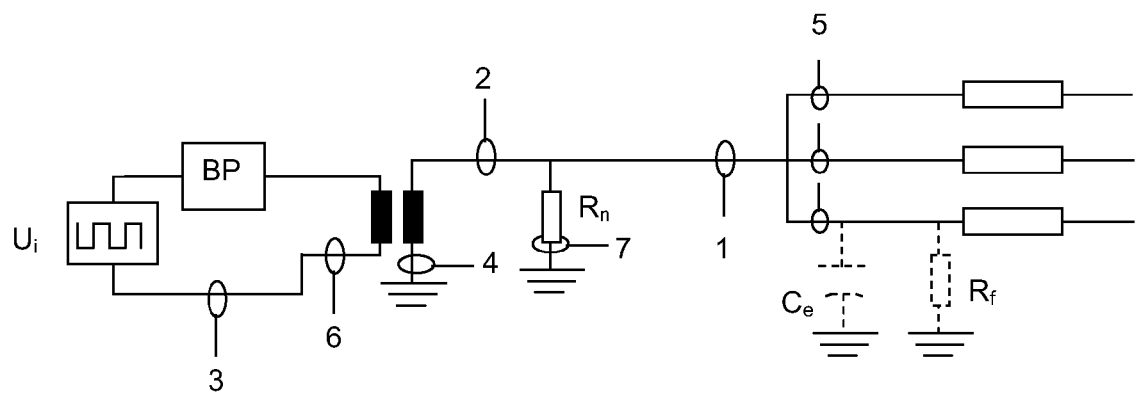
FIG. 11 schematically shows a ground fault detection system according to a fourth embodiment of the present invention, for a synchronous three-phase electrical machine as shown in FIG. 10.
Figure 12:
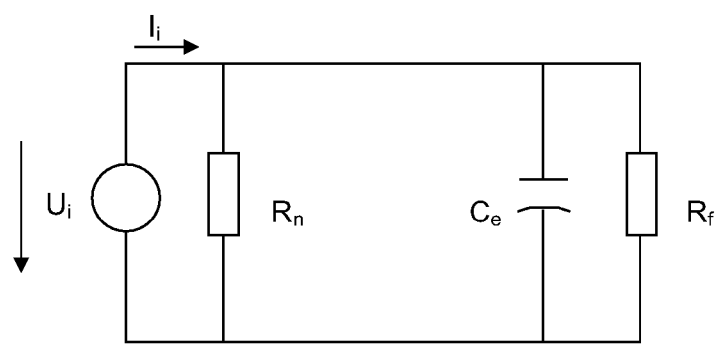
FIG. 12 shows an equivalent diagram, in a ground-fault situation, of the ground fault detection system shown in FIG. 11.

A fourth embodiment of the present invention is shown in FIGS. 10-12, which is identical with the first embodiment of the present invention described above, apart from that no potential voltage transformer is used in the electrical machine. Further, since no potential voltage generator is used measurement positions 3 and 6 will be the same position.

Figure 13:
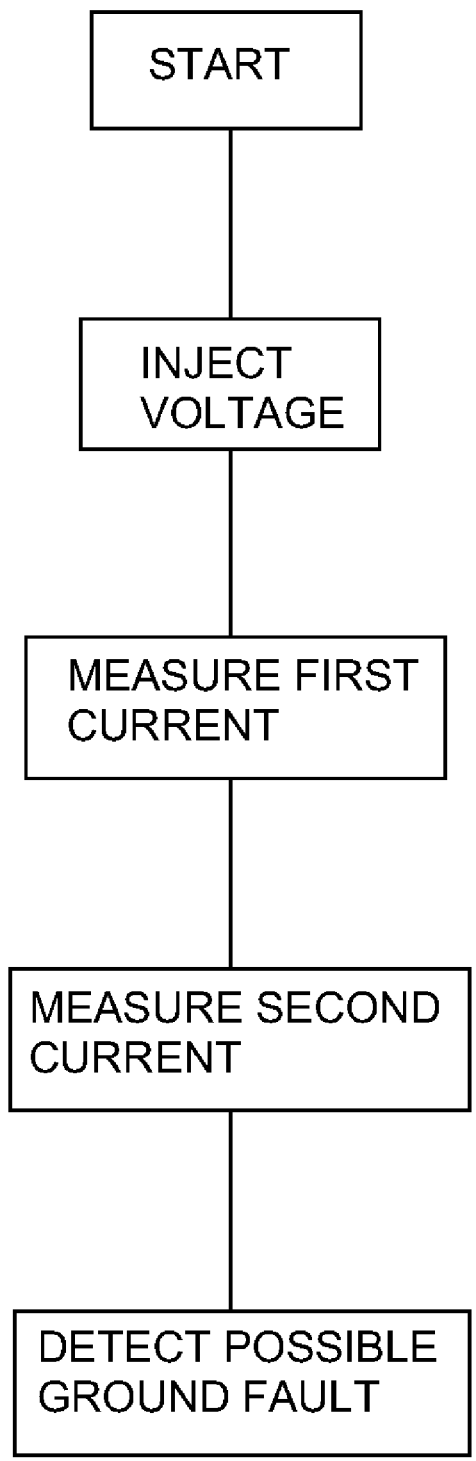
FIG. 13 is a flow diagram of a method for detection of ground fault common for the embodiments of the present invention.

The method steps for detection of ground faults in an electrical machine, such as a generator, of the embodiments described above is shown in FIG. 13. The method starts by injecting an off-nominal frequency voltage $U_i$ between the neutral point of the synchronous three-phase electrical machine and ground. The next step comprises measuring a first current, resultant from the injected off-nominal frequency voltage $U_i$, at a first position 1, 2, 3, 4 of the electrical machine. The next step comprises measuring a second current, resultant from the injected off-nominal frequency voltage $U_i$, at a second position 3, 4, 5, 6, 7, different from the first position, of the electrical machine. The final step comprises detecting a ground fault by calculations based on the first and second currents.

It will be obvious that the present invention may be varied in a plurality of ways. Such variations are not to be regarded as departure from the scope of the present invention as defined by the appended claims. All such variations as would be obvious for a person skilled in the art are intended to be included within the scope of the present invention as defined by the appended claims.

What is claimed is:

1. A ground fault detection arrangement for a synchronous three-phase electrical machine, which synchronous three-phase electrical machine has a neutral point connected to ground, wherein said ground fault detection arrangement comprises injection means arranged to inject an off-nominal frequency AC voltage (Ui) between said neutral point and said ground, characterized in that said ground fault detection arrangement comprises:
   a first measurement means arranged to measure a first current, resultant from said injected voltage, at a first position of said synchronous three-phase electrical machine, wherein said first position is between said neutral point and said ground;
   a second measurement means arranged to measure a second current, resultant from said injected voltage, at a second position of said synchronous three-phase electrical machine, wherein said second position is mounted on the phase windings of said synchronous three-phase electrical machine;
   a control means arranged to detect a ground fault in said synchronous three-phase electrical machine based on said first and second currents.

2. The ground fault detection arrangement according to claim 1, wherein said synchronous three-phase electrical machine comprises a neutral resistor (Rn) between said neutral point and said ground, or a distribution grounding transformer between said neutral point and said ground.

3. The ground fault detection arrangement according to claim 1, wherein said synchronous three-phase electrical machine comprises a distribution grounding transformer or a voltage transformer.

4. The ground fault detection arrangement according to claim 1, wherein said electrical machine is a generator.

5. The ground fault detection arrangement according to claim 1, comprising a temperature detection means arranged to detect a working temperature of said electrical machine and its auxiliaries, preferably the temperature drift a neutral resistor or the transformers used for measuring purposes.

6. An electrical system comprising a ground fault detection arrangement and a synchronous three-phase electrical machine, which synchronous three-phase electrical machine has a neutral point connected to ground, wherein said ground fault detection arrangement comprises injection means arranged to inject an off-nominal frequency AC voltage (Ui) between said neutral point and said ground, characterized in that said ground fault detection arrangement comprises:
   a first measurement means arranged to measure a first current, resultant from said injected voltage, at a first position of said synchronous three-phase electrical machine, wherein said first position is between said neutral point and said ground;
   a second measurement means arranged to measure a second current, resultant from said injected voltage, at a second position of said synchronous three-phase electrical machine, wherein said second position is mounted on the phase windings of said synchronous three-phase electrical machine; and
   a control means arranged to detect a ground fault in said synchronous three-phase electrical machine based on said first and second currents.

7. A method for ground fault detection in a synchronous three-phase electrical machine, which synchronous three-phase electrical machine has a neutral point connected to ground, characterized by the following steps:
   injecting an off-nominal frequency AC voltage (Ui) between said neutral point and said ground;
   measuring a first current, resultant from said injected off-nominal frequency voltage (Ui), at a first position of said synchronous three-phase electrical machine, wherein said first position is between said neutral point and said ground;
   measuring a second current, resultant from said injected off-nominal frequency voltage (Ui), at a second position of said synchronous three-phase electrical machine, wherein said second position is mounted on the phase windings of said synchronous three-phase electrical machine; and
   detecting a ground fault in said synchronous three-phase electrical machine by calculations based on said first and second currents.

8. A ground fault detection arrangement for a synchronous three-phase electrical machine, which synchronous three-phase electrical machine has a neutral point connected to ground, wherein said ground fault detection arrangement comprises injection means arranged to inject an off-nominal frequency AC voltage (Ui) between said neutral point and said ground, characterized in that said ground fault detection arrangement comprises:
   a first measurement means arranged to measure a first current, resultant from said injected voltage, at a first position of said synchronous three-phase electrical machine, wherein said first position is between said neutral point and said ground;
   a second measurement means arranged to measure a second current, resultant from said injected voltage, at a second position of said synchronous three-phase electrical machine;
   a control means arranged to detect a ground fault in said synchronous three-phase electrical machine based on said first and second currents;
   wherein said synchronous three-phase electrical machine comprises a distribution grounding transformer or a voltage transformer; and
   wherein said second position is at a secondary side of said transformers, between ground and a primary side of said transformers, or placed on the phase windings of said synchronous three-phase electrical machine.

* * * * *